United States Patent
Ahn

(10) Patent No.: US 8,032,185 B2
(45) Date of Patent: Oct. 4, 2011

(54) OPERATION MODE CONVERSION DEVICE, MOBILE COMMUNICATION TERMINAL HAVING THE OPERATION MODE CONVERSION DEVICE AND METHOD FOR CONVERTING OPERATION MODE USING THE SAME

(75) Inventor: Kwang-Hyun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 1068 days.

(21) Appl. No.: 11/849,110

(22) Filed: Aug. 31, 2007

(65) Prior Publication Data
US 2008/0058022 A1 Mar. 6, 2008

(30) Foreign Application Priority Data
Sep. 4, 2006 (KR) .................. 10-2006-0084882

(51) Int. Cl.
*H04M 1/00* (2006.01)
(52) U.S. Cl. .................. 455/566; 455/550.1; 455/575.1; 345/33; 345/38; 345/659
(58) Field of Classification Search .................. 455/457, 455/566, 550.1, 575.1; 345/619, 659, 467, 345/660, 672, 33, 38, 30, 87
See application file for complete search history.

(56) References Cited

U.S. PATENT DOCUMENTS

| 6,047,196 | A | * | 4/2000 | Makela et al. | ............. 455/556.1 |
| 6,049,697 | A | * | 4/2000 | Scozzarella et al. | ......... 340/7.31 |
| 6,530,027 | B1 | * | 3/2003 | Morita | ........................... 713/322 |
| 2003/0227425 | A1 | * | 12/2003 | McKay et al. | .................... 345/31 |
| 2005/0113025 | A1 | * | 5/2005 | Akamatsu et al. | ........... 455/41.3 |
| 2006/0148520 | A1 | * | 7/2006 | Baker et al. | ................ 455/556.2 |
| 2007/0213090 | A1 | * | 9/2007 | Holmberg | ................. 455/550.1 |

* cited by examiner

*Primary Examiner* — Dominic E Rego
(74) *Attorney, Agent, or Firm* — Birch, Stewart, Kolasch & Birch, LLP

(57) ABSTRACT

An operation mode conversion device, a mobile communication terminal having the same and a method for converting the operation mode are provided. According to an embodiment, a user interface element is provided with an input unit configured to generate a signal to switch a current operation mode to a selected operation mode upon being pressed by a user, the selected operation mode being set with respect to a position on the input unit, and a display area is located at a central portion of the input unit, the display area being configured to output information about the selected operation mode. The user can quickly perform menu navigation to convert the operation mode as desired, the information about the converted operation mode is conveniently viewed, and the overall size of the mobile phone can be minimized.

21 Claims, 17 Drawing Sheets

OPERATION MODE CONVERSION DEVICE, MOBILE COMMUNICATION TERMINAL HAVING THE OPERATION MODE CONVERSION DEVICE AND METHOD FOR CONVERTING OPERATION MODE USING THE SAME

RELATED APPLICATION

This application claims priority to Korean Patent Application No. 10-2006-0084882, filed on Sep. 4, 2006, which is herein expressly incorporated by reference in its entirety.

BACKGROUND

The present disclosure relates generally to an operation mode conversion device, mobile communication terminal having the operation mode conversion device, and methods for converting operation mode using the same.

Mobile communication terminals (e.g., mobile phones, handsets, wireless communication devices, etc.) are being developed to handle increased capabilities and functions. As such, several different operation modes may be performed, such as, for example, a system management mode, a phone book mode, an entertainment (or games) mode, and the like.

An operation mode function may be selected by the user via an input device (e.g., a keypad, buttons, function keys, etc.). Typically, a user interface menu (or other navigation scheme) allows the user to initially select higher level menu items, which then allows further selection of lower level sub-menu items that exist under each higher level menu item. As numerous menu items and sub-menu items may exist due to increased capabilities of the mobile phone, the user must go through many steps of selecting certain buttons, and thus, menu navigation is time consuming and inconvenient.

As a more specific example, a conventional mobile communication terminal allows a user to make a voice call to another party via wireless communication. In addition, various operation mode conversion devices for converting into the corresponding operation modes are implemented in the conventional mobile communication terminal so as to perform various functions.

A button type, a scroll type, or a wheel type of an operation mode selector may be used to perform as the conventional operation mode conversion device. The operation mode selectors are operated to output information about an operation mode on a display of the terminal. Also, control keys for selecting the operation mode are located at fixed positions of an input portion (e.g. key pad) to allow the user to select the operation modes.

The operation mode conversion device having the operation mode selector and the mobile terminals having the operation mode conversion device are configured to select an operation mode which is actually desired to be used and belongs to a lower level of each menu item after a higher level menu (e.g. a manager function, a diary function of telephone numbers, etc., an entertainment function such as an entertainment, etc.) is selected. However, such configuration is inconvenient for the user, because the user must manipulate the operation mode selector several times to select the desired operation mode.

Therefore, there is a need to improve the operation mode selection and conversion operation. In some mobile terminals, the operation mode can be selected through simple manipulation. However, the converted operation mode may still not be easily and simply recognized by the user.

Meanwhile, in some mobile phones, a plurality of selection buttons respectively used for selecting and converting one of the many operation modes may be used to allow more simple and rapid operation mode selection. However, the size of the mobile terminal does not allow for a large number of selection buttons to be provided thereon.

BRIEF DESCRIPTION

The present inventors recognized at least the above-identified problems of certain conventional mobile phones. Based upon such recognition, the following features have been conceived.

One aspect of the present disclosure is to convert an operation mode through fast and simple manipulation for performing desired function by a user.

Another aspect is to enable the user to easily recognize information about the converted operation mode.

Still another aspect is to enable control keys for controlling the converted operation mode being activated in a state corresponding to the operation mode, with the conversion of the operation mode.

Still another aspect is to enable the operation mode conversion device to be configured simply and requiring a limited amount of space (area) in the mobile communication terminal.

To achieve at least the above aspects, there is provided operation mode conversion device, mobile communication terminal having the operation mode conversion device and a method for conversing operation mode using the same.

In an embodiment of the present disclosure, an operation mode conversion device includes an input unit configured to generate a signal to switch a current operation mode to a selected operation mode upon being pressed by a user, the selected operation mode being set with respect to a position on the input unit, and a display area located at a central portion of the input unit, the display area being configured to output information about the selected operation mode.

Another embodiment of the operation mode conversion device may include an input unit configured to generate a signal to switch a current operation mode to a selected operation mode upon sensing applied pressed by a user, the selected operation mode being set with respect to a position of the user applied pressure, a display area located at a central portion of the input unit, the display area being configured to output information about the selected operation mode, and a selection button having a graphical pattern indicating a control function related to the selected operation mode and to allow the user to operate the control function.

An embodiment of the mobile communication terminal having the operation mode conversion device may include at least one body provided with a display, an input device, and the operation mode conversion device mounted in the body. The operation mode conversion device includes an input unit configured to generate a signal to switch a current operation mode to a selected operation mode upon being pressed by a user, the selected operation mode being set with respect to a position on the input unit, and a display area located at a central portion of the input unit, the display area being configured to output information about the selected operation mode.

Another embodiment of the mobile communication terminal having the operation mode conversion device may include at least one body provided with a display, an input device, and the operation mode conversion device mounted in the body. The operation mode conversion device includes an input unit configured to generate a signal to switch a current operation mode to a selected operation mode upon sensing applied pressed by a user, the selected operation mode being set with respect to a position of the user applied pressure, a display area located at a central portion of the input unit, the display area being configured to output information about the selected operation mode, and a selection button having a graphical pattern indicating a control function related to the selected operation mode and to allow the user to operate the control function.

Herein, the operation mode conversion device may further include a control unit converting into the operation mode set with respect to each pressurized position by signals generated by the input unit and enabling the converted information about the operation mode to be outputted in the display area.

The selection button may comprise a sensor unit outputting signals by sensing a change of a capacitance by a user's finger; and a display displaying information of a control function about the operation mode converted by the input unit.

The display disposed at the selection button may be configured by using a display device including one of an LCD and an LED.

Further, the operation mode conversion device may include a circuit board having a sensor unit and a control unit; the input unit may include an operation member having a first press unit capable of being pressed, the first press unit having a ring shape, a second press unit that presses the sensor unit, and a light transmission window disposed at the central portion of the first press unit; the display area may include a display device disposed in a lower portion of the operation member under the light transmission window; and the sensor unit may be configured to generate signals corresponding to different operation modes according to a position of the external pressure applied to the operation member and the control unit is configured to control the display device to output information related to the selected operation mode.

The operation member may further include a connecting unit at an end of the second press unit.

Further, the selection button may include the display displaying the control function with respect to the operation mode converted by the input unit; a sensor unit disposed adjacent to the area of the display and outputting signals after sensing the change of capacitance by the user's finger; and a light-emitting unit emitting light such that the user can recognize the pattern formed by the display.

The display disposed at the selection button may include at least two display patterns, and a light-emitting device corresponded to the display pattern, a light-emitting device corresponding to each display pattern, and a division wall that separates each display pattern and corresponding light emitting device.

Further, the selection button may include a sensor unit outputting signals after sensing the change of capacitance by the user's finger, and a display displaying the control function with respect to the operation mode converted by the input unit.

An embodiment of a method for converting an operation mode may include operating an input unit for converting a set operation mode, setting the operation mode converted by the operation of the input unit, and displaying information of the converted operation mode on a display formed at a central portion of the input unit.

Another embodiment of a method for converting the operation mode may include generating a signal by operating of an input unit for converting a set operation mode, setting the operation mode converted by a controlling unit based on the signal of the input unit, displaying main information of the converted operation mode on a main display formed at a central portion of the input unit and displaying sub-information about the main information on a sub-display formed at a selection button disposed at the circumference of the input unit, and activating the selection button for executing the operation mode converted by the operation of the input unit.

Still another embodiment of a method for converting the operation mode may include checking whether an input unit or a selection button is operated for converting a set operation mode, setting the operation mode converted by the operation of the input unit, displaying main information of the operation mode converted by the operation of the input unit or the selection button on a main display formed at a central portion of the input unit and displaying sub-information about the main information on a sub-display formed at the selection button disposed at the circumference of the input unit, and activating the selection button for executing the operation mode converted by the operation of the input unit or the selection button.

The information of the operation mode, which is displayed on the display of the input unit may be displayed as letters or icons, or the information displayed on the display of the selection button may be displayed as symbols or icons.

Further the selection button enables an instructing information to be displayed as the current operation mode is directly converted into frequently used one, wherein the instructing information is capable of executing the converted operation mode.

Another embodiment of a mobile phone is provided. The mobile phone includes a screen to display information to a user, and a main user interface element adjacent to the screen and having a visual output portion and a touch-sensitive portion along a periphery of the visual output portion. The main user interface element is capable of being pressed to activate a particular function and capable of being touched along the touch-sensitive portion to activate one or more additional functions, and a status of at least one of the particular function and additional functions being displayed on the visual output portion according to function activation.

Further, the main user interface element may include a circular member accommodating the visual output portion, and an annular member at a periphery of the circular member that serves as the touch-sensitive portion. The annular member may have touch detection sensors that detect a user finger swipe movement thereon. The touch detection sensors may detect changes in at least one of resistance and capacitance caused by the user finger movement thereon. The mobile phone may further comprise one or more additional user interface elements located around the touch-sensitive portion to provide additional user interface options to the user. The one or more additional user interface elements may include a display screen or a visual output device.

Further scope of applicability of the present application will become more apparent from the detailed description given hereinafter. However, it should be understood that the detailed description and specific examples, while indicating preferred embodiments of the disclosure, are given by way of illustration only, since various changes and modifications within characteristics of the disclosure will become apparent to those skilled in the art from the detailed description.

DETAILED DESCRIPTION

The following exemplary embodiments will be described on the basis of an operation mode conversion device having an input means adapting an FSR (Force Sensing Resistor) method or the input means adapting a combination of the FSR method and a capacitance method. However, such is merely exemplary, as other types of input recognition means may additionally and/or alternatively be used.

Further, a mobile phone (or terminal) having the operation mode conversion device described herein may take various forms, such as a bar-type, a sliding-type, a swing-type, and the like. However, such is merely exemplary, as many other types of mobile phone form factors may additionally and/or alternatively be used.

Figure 1A:
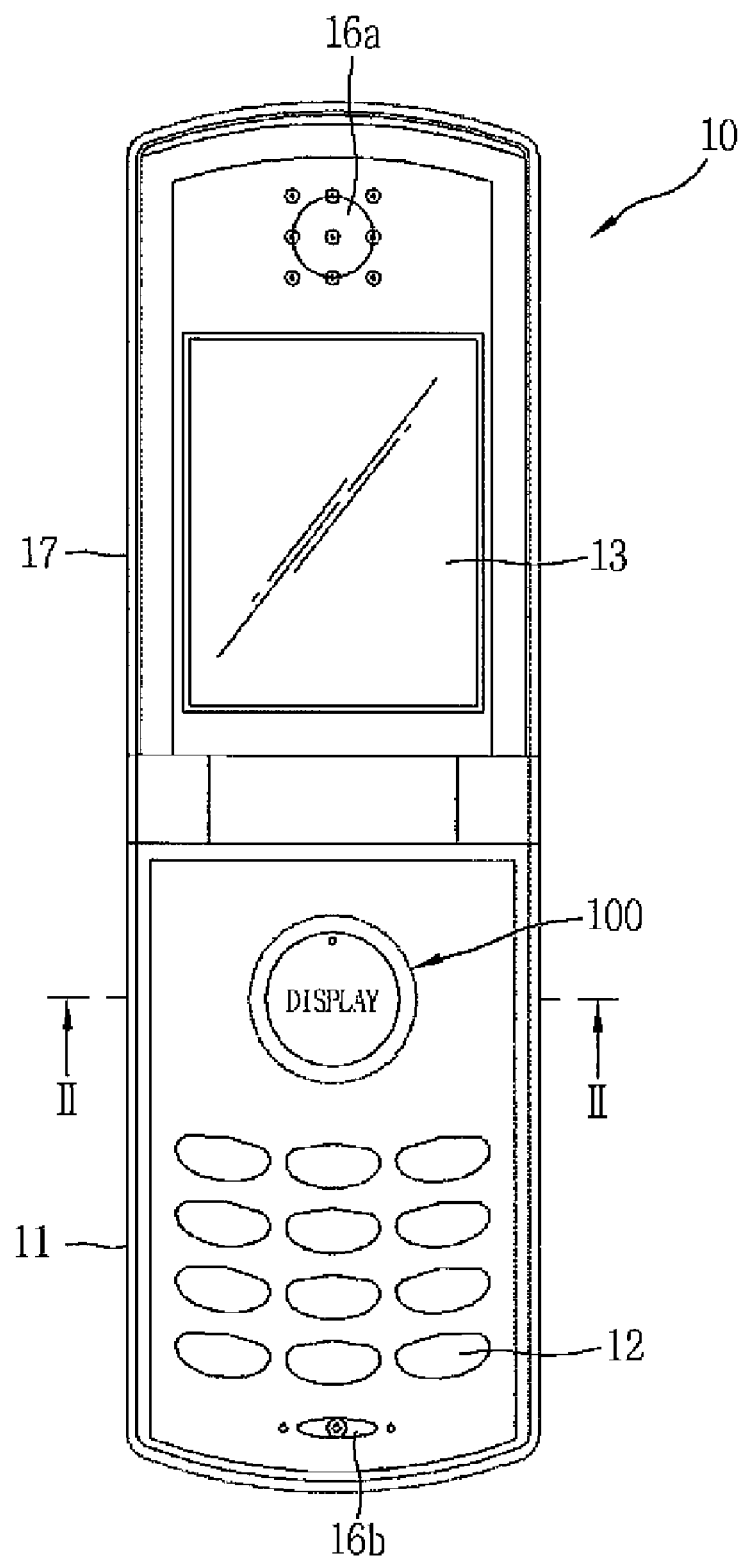
FIG. 1A is a diagram showing an aspect of a mobile communication terminal having an operation mode conversion device in accordance with an exemplary embodiment.

Referring to FIG. 1A, there is shown a mobile communication terminal 10 having an operation mode conversion device in accordance with an exemplary embodiment. An input unit 12 (e.g., a keypad, buttons, keys, touch-sensitive elements, etc.) for inputting data and a display 13 (e.g., an LCD screen, a touch-sensitive screen, a flexible screen, etc.) for outputting information related to the inputted data may be provided at the mobile communication terminal 10. A sound output device 16a and a sound input device 16b may be provided at the mobile communication terminal 10. The mobile communication terminal 10 may be include one or more bodies 11, 17.

Herein, the device for converting the operation mode may include an input unit 100, such as scroll button. Here, the term scroll button is merely an exemplary term that may refer to various types of user input devices, such as a scrollable member, a rotatable wheel, a dial button, an element with an annular periphery member that may be turned (rotated) by the user, etc.). The scroll button 100 may include a sensor driven in the FRS method (i.e., input unit) for converting the operation mode.

The scroll button 100 may include a display area (e.g., an LCD screen, a visual output device, an illumination device, etc.) for outputting information about the converted operation mode in order for a user to easily recognize the operation performing a certain function.

Figure 1B:
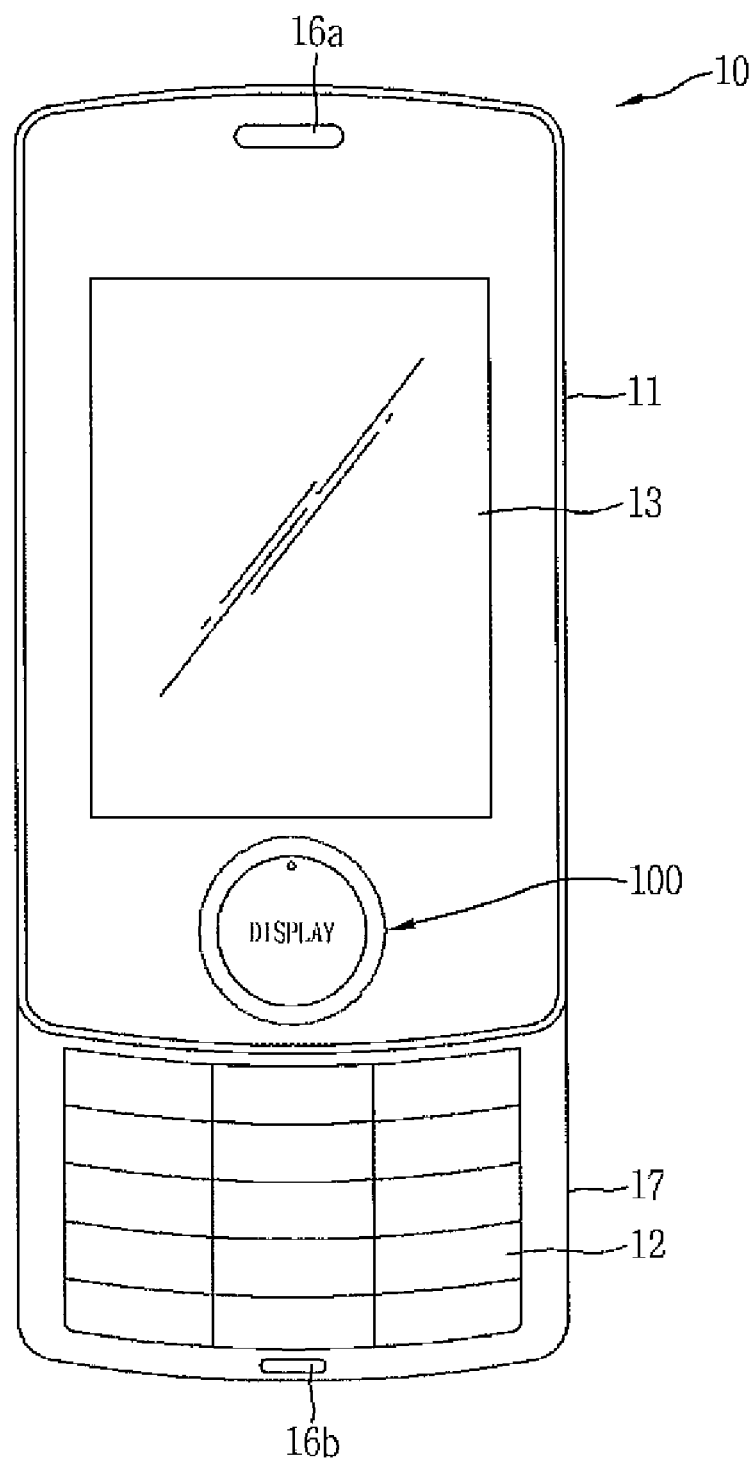
FIG. 1B is a diagram showing another aspect of the mobile communication terminal having the operation mode conversion device in accordance with an exemplary embodiment.

FIG. 1B is another aspect of mobile communication terminal 10 having an operation mode conversion device in accordance with an exemplary embodiment. It is understood that the following embodiments can be applied to various types and shapes of mobile communication terminals.

Figure 2:
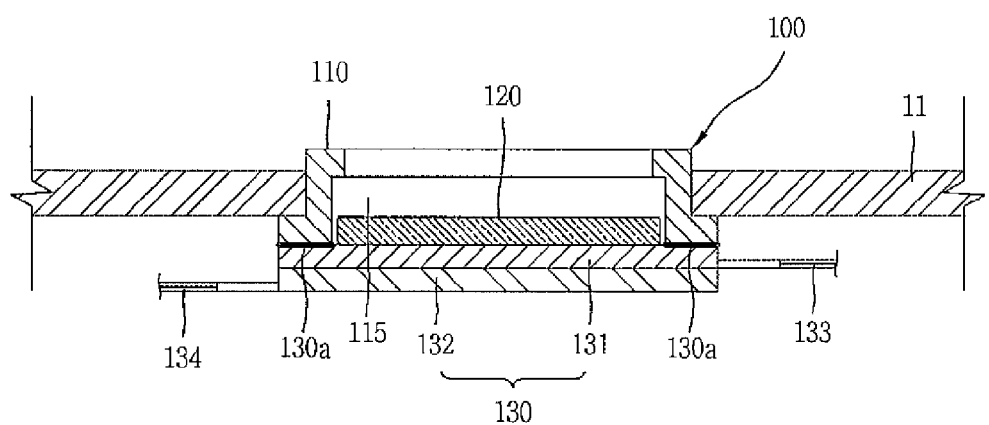
FIG. 2 is a brief cross-sectional view showing a state that the mobile communication terminal having the operation mode conversion device is cut along a line "II-II" of FIG. 1.

As shown in FIG. 2, a means capable of sensing externally applied pressure may be coupled to a circuit board 130 (having a plurality of sensors) in the scroll button 100 constituting the operation mode conversion device. In other words, the scroll button 100 may have one or more sensors that can detect how the user manipulates a portion thereof. The sensors disposed on the circuit board 130 are provided with a sensor unit 130a that senses the external pressure being applied, and each sensor unit 130a may be formed in a ring-like shape. Here, it is understood that various types of sensors may be employed and are not limited to those described herein.

Figure 3:
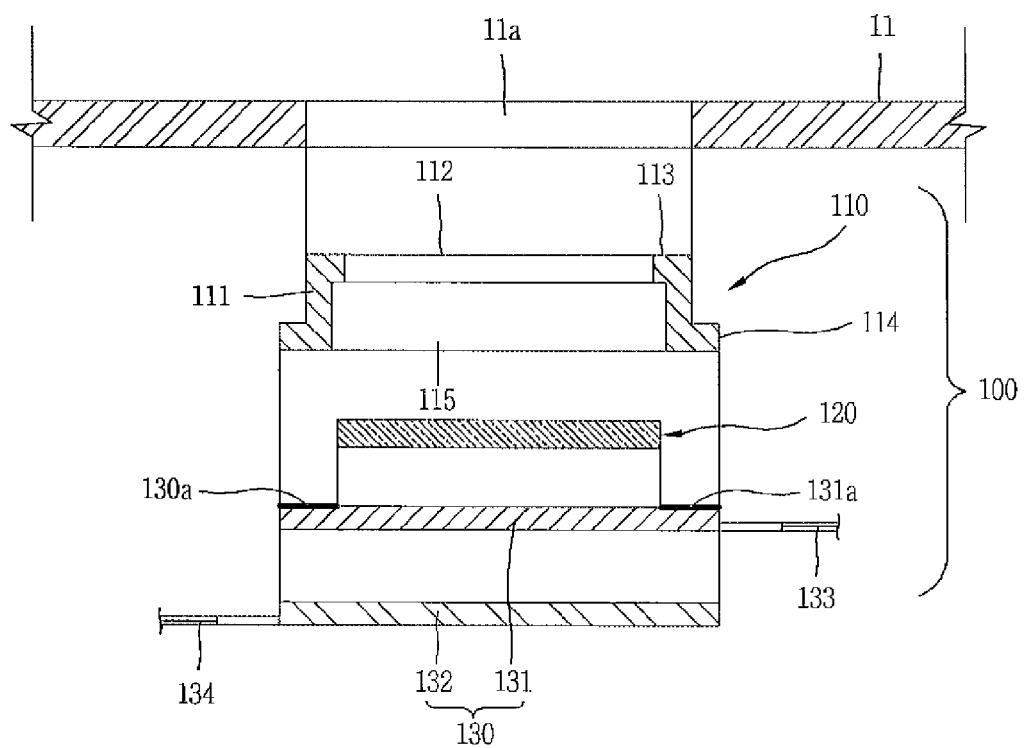
FIG. 3 is an exploded view of the mobile communication terminal of FIG. 2.
Figure 4:
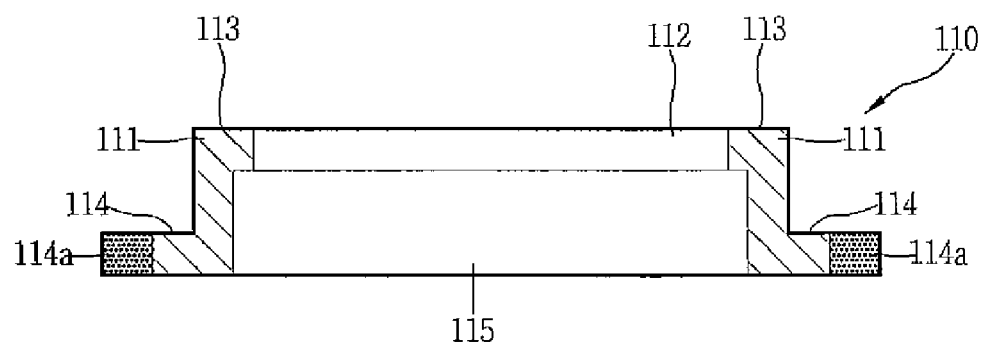
FIG. 4 is a cross-sectional view showing another aspect of an operation member of the operation mode conversion device in accordance with an exemplary embodiment.

As shown in FIGS. 2 through 4, an operation member 110 (or other appropriate element) may be applied as part of a pressing means for generating signals when the sensor unit 130a disposed on the circuit board 130 has been activated due to pressure applied thereto by the user. A first press portion (unit) 113 (or other appropriate element) may be provided at a lateral circumference of an operation member body 111 (i.e., at a circumference of the upper surface as depicted), which corresponds to an area capable of being pressed by the user's finger. A second press portion (unit) 114 (or other appropriate element) capable of pressing the sensor unit 130a disposed on the circuit board 130 may be provided on the circumference at an opposite side of the first press unit 113 (i.e., at a circumference of the lower surface as depicted).

The second press unit 114 enables the pressure applied on the sensing area to be stably transferred, and may be formed in a more extended manner to the outer side of the operation member body 111 such that operation member 110 is not separable from a body 11 of the mobile communication terminal 10. The sensing area of the circuit board 130 refers to an area that is pressed by the second press unit 114.

In addition, a light transmission window 112 (or other type of relatively transparent element) capable of transmitting light may be formed at the center (or near a central region) of the operation member 110, and a receiving portion 115 (or other type of accommodating means) may further be formed underneath the light transmission window 112. The light transmission window 112 allows information about a converted operation mode to be viewed by the user. The receiving portion 115 accommodates a display device 120 (or other type of visual output means), which can output the corresponding information in order for the user to recognize the information about the converted mode through the light transmission window 112.

The circuit board 130 may be composed of a board (or other type of substrate) for controlling output of the sensor (hereinafter, referred as a "sensor board 131") having the sensor unit 130a and a board for controlling output of the display device (hereinafter, referred as "display device board 132") for controlling the output of the display device 120. The two boards 131, 132 may have at least portions thereof being overlapped with each other as shown in FIGS. 2 and 3. The sensor board 131 may be disposed at the lower portion of the operation member 110, while the display device board 132 may be disposed at the lower portion of the sensor board 131. The display device 120 may be placed at the center (or near) of the sensor board 131 to be inserted and coupled at the receiving portion 115 of the operation member 110. Although the display device 120 is disposed at the center (or near) of the sensor board 131, it is electrically connected to the display device board 132 for controlling the output. The display device 120 may be composed of an LCD, an LED or the like.

The operation member 110 may be elastically-supported and coupled to the body 11 of the terminal via a connecting unit 114a formed of an elastic material. The connecting unit 114a may be located at the circumference of the end (i.e. along the circular edge) of the second press unit 114.

An example to which the scroll button 100 constituting the operation mode conversion device is applied to the mobile communication terminal 10, as aforementioned, will be described as follows. A connecting hole 11a (or opening) is formed at a certain area of the mobile communication terminal body 11, and the operation member 110 constituting the scroll button 100 is inserted into the connecting hole 11a for mounting such that the light transmission window 112 portion is exposed from the mobile communication terminal body 11. When at least a portion of the first press unit 113 is pressed by the user, the operation member 110 transfers the applied pressure to the sensor unit 130a disposed at the lower portion of the operation member 110.

The circuit board 130 may be composed of one circuit board having the sensor unit 130a and the display device 120 for controlling output of the sensor unit 130a and controlling the output of the display device 120.

Figure 5A:
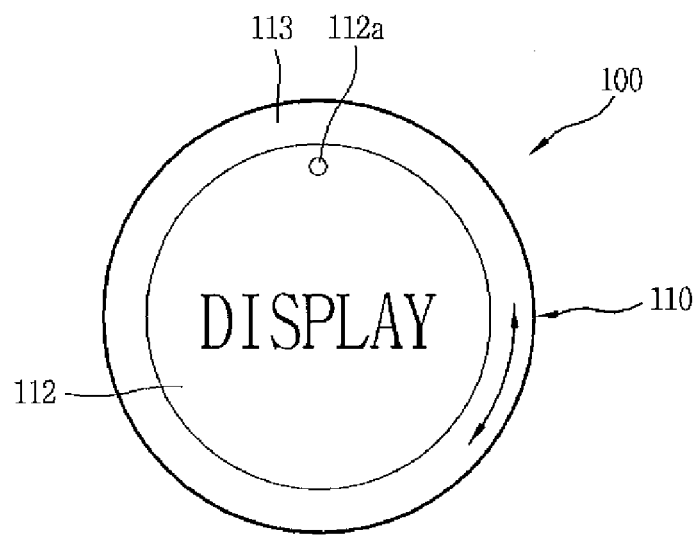
FIG. 5A through FIG. 5C is a diagram showing a state that a converted operation mode is displayed at the operation mode conversion device after the operation mode is converted by the operation mode conversion device in accordance with an exemplary embodiment.
Figure 5B:
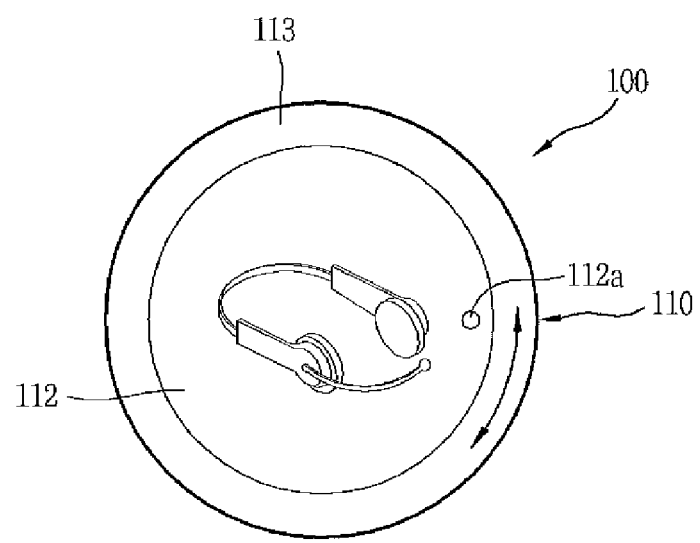
Figure 5C:
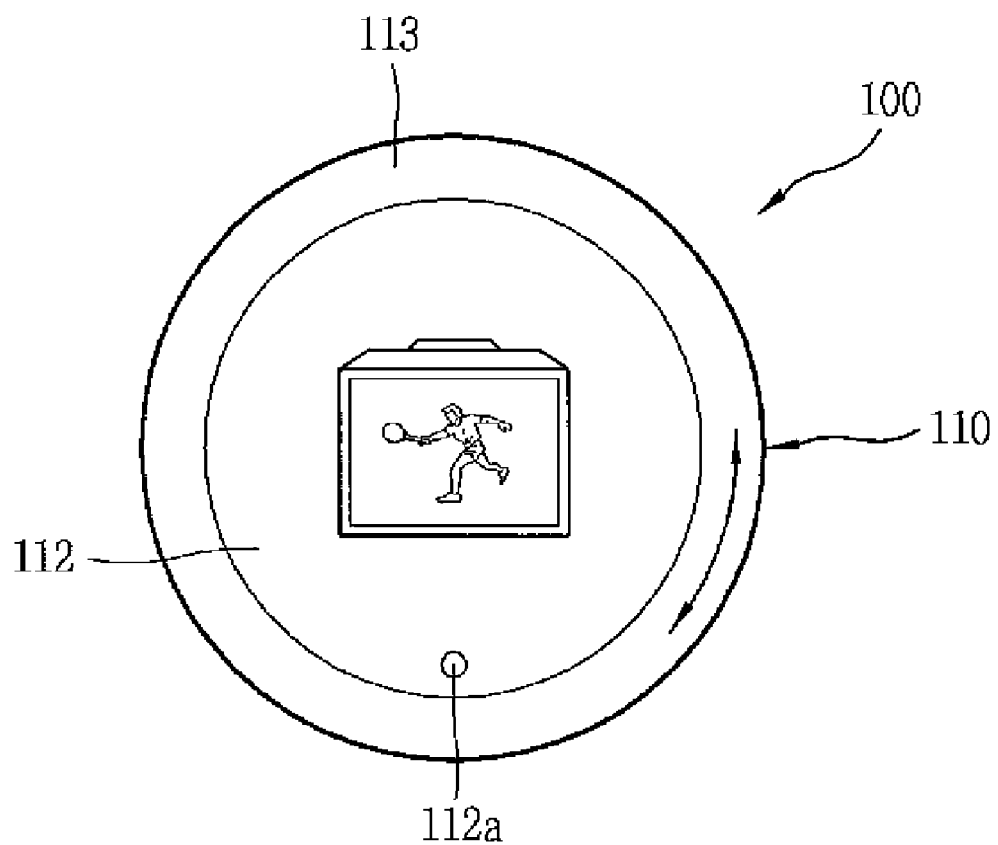

The operation mode conversion device as configured above may be operated as shown in FIGS. 5A through 5C.

A user may manipulate the first press unit 113 of the operation member 110 portion of the scroll button 100 by moving a finger along the area of the first press unit 113, and the sensors detects such movement and pressure/force being applied. Herein, the sensors located at each pressed area will outputs signals that are generated from the sensor unit 130a, which are recognized by a controlling unit (such as a microprocessor or other type of controller). Certain areas detected by certain sensors can be associated with different types of operation modes. For example, when a right-side periphery portion of the scroll button 100 is pressed (touched or dragged by the user's finger), a certain operation mode associated with the right-side periphery portion can be activated, while pressing (or touching) of the left-side periphery portion will activate another type of operation mode.

The controlling unit (such as a microprocessor or other type of controller) may convert each operation mode and output appropriate information about the operation mode according to the signals generated by user manipulation of the scroll button 100. Each operation mode may also be selected by user manipulation of the scroll button 100, and upon viewing the information provided on the display device 120, additional user manipulations may be allowed.

For example, as shown in FIG. 5A, the scroll button 100 of the operation mode conversion device is in an exemplary operation state that may be called an initial (early) operation mode. Here, information about the initial (operation) mode state can be seen by the user on the display via the light transmission window 112. Thus, the user can know the current operation mode by simply viewing the initial mode state being shown in the display via the light transmission window 112.

An indicator 112a (or other type of visual output) for indicating the initial mode state may also be shown on the display seen through the light transmission window 112 in order to indicate that the scroll button 100 positioned in the initial mode. The indicator 112a may be shown at different positions (locations) depending upon the state of the selected operation mode of via the scroll button 100. As such, the operation mode corresponding to the different positions on the display may be easily recognized by user.

In the initial mode, if the user moves his finger along the first press unit 113 of the operation member 110 in the clockwise or counter-clockwise direction (i.e., when the user scrolls or drags his finger along the first press unit 113), the sensor unit 130a senses the changes in the area being pressed (or touched), and thus the operation mode can changed to a different operation mode. The information about the converted or selected operation mode may be outputted on the display device 120 to be easily viewed by the user.

In this case, as aforementioned, the indicator 112a may be shown on the display, and may be displayed in a manner that follows (or tracks) the user's finger movements being made along the first press unit 113.

When in the initial mode, the state outputted through the display device 120 may be displayed in terms of text (as shown in FIG. 5A). Additional information such as the date, time etc. may also be shown on the display. FIGS. 5B and 5C show some exemplary states of operation modes that change according to the user's pressed (or touched) position along the first press unit 113. Also, appropriate information about the current operation mode may be outputted on the display according to how the first press unit 113 is touched (or scrolled).

Further, when the information is outputted as the converted operation mode, the indicator 112a may maintain the state displayed at the position of the first press unit 113 pressurized with respect to the converted operation mode. As the position displayed by the indicator 112a is maintained, when converting into another operation mode, the pressurized position may be easily selected according to the first press unit 113.

In the aforementioned description, a current operation mode is converted into the selected operation mode according to the user pressed (touched) position on the scroll button 100, and information about the converted operation is outputted. The operation mode may be selected according to the pressed position by operation of the scroll button 100, as a result of conversion signals being generated by activating an operation key in order to convert into the selected operation mode. In this case, the signals to convert the operation mode into the selected mode are generated when the entire first press unit 113 is pressed. That is, when the signals with respect to the entire area of the sensor unit 130a being pressed are generated, the conversion of the selected operation mode may be implemented due to such signals.

The exemplary embodiments described with respect to FIGS. 1A through 5C can be summarized as follows. The main user interface means (i.e., scroll button 100) (e.g., a touch-sensitive disk, wheel, button, etc.) can be located adjacent to (or near) a main screen 13 and can be entirely pressed (or pushed, held down, etc.) to activate a particular function and/or a portion thereof may be touched (or swiped, pressed, etc.) to activate one or more different functions. The main user interface means (scroll button 100) may accommodate a visual output means (e.g., a display screen) at a central portion thereof with an annular periphery portion being touch activated. Depending on how the user touches (or presses) the annular periphery portion (e.g., swiping in a clockwise or counter-clockwise direction), different operations modes can be selected and activated, while the status or other information related to an operation mode is shown to the user at the central portion of the main user interface means (scroll button 100). Furthermore, additional user interface means (selection button 200) may be additionally provided, and will be described in more detail as follows.

Figure 6A:
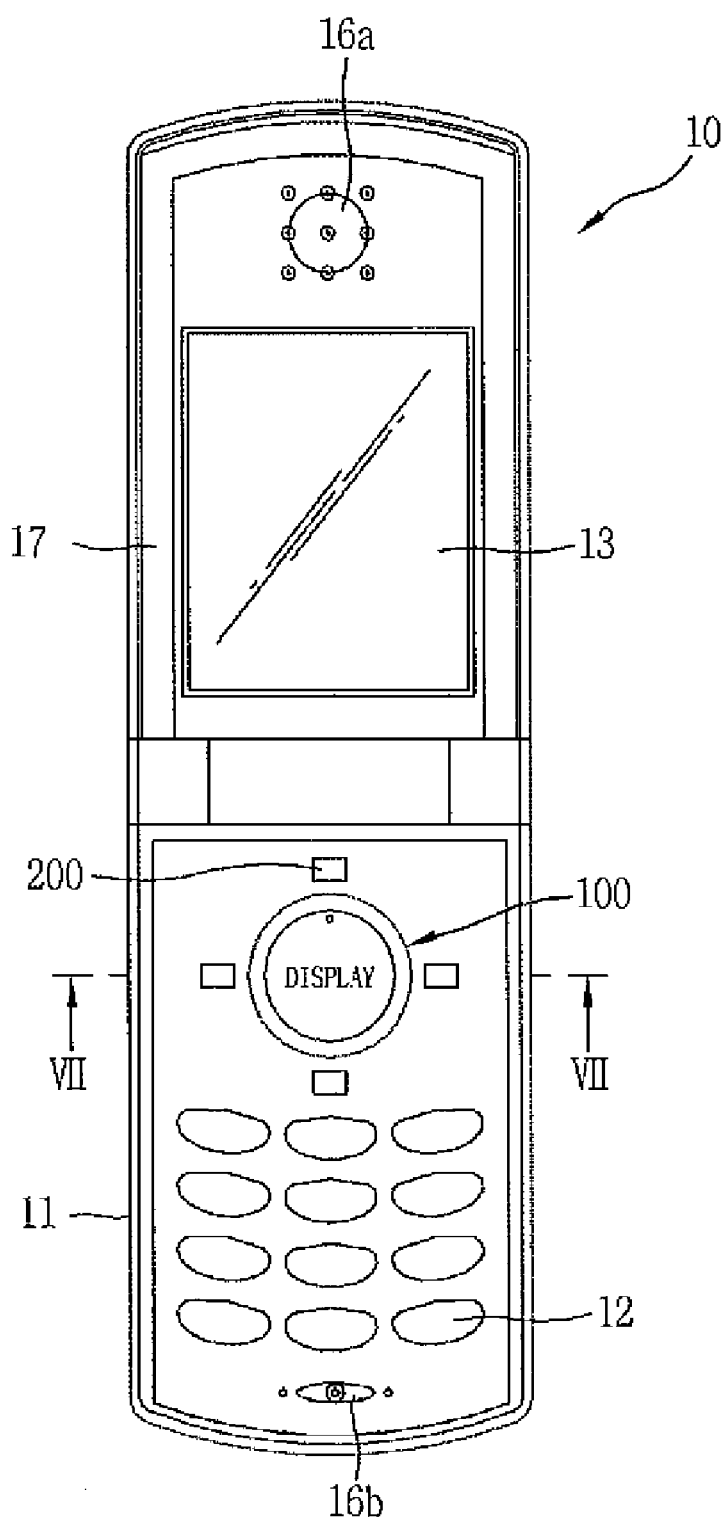
FIG. 6A is a diagram showing an aspect of a mobile communication terminal having an operation mode conversion device in accordance with another exemplary embodiment.
Figure 6B:
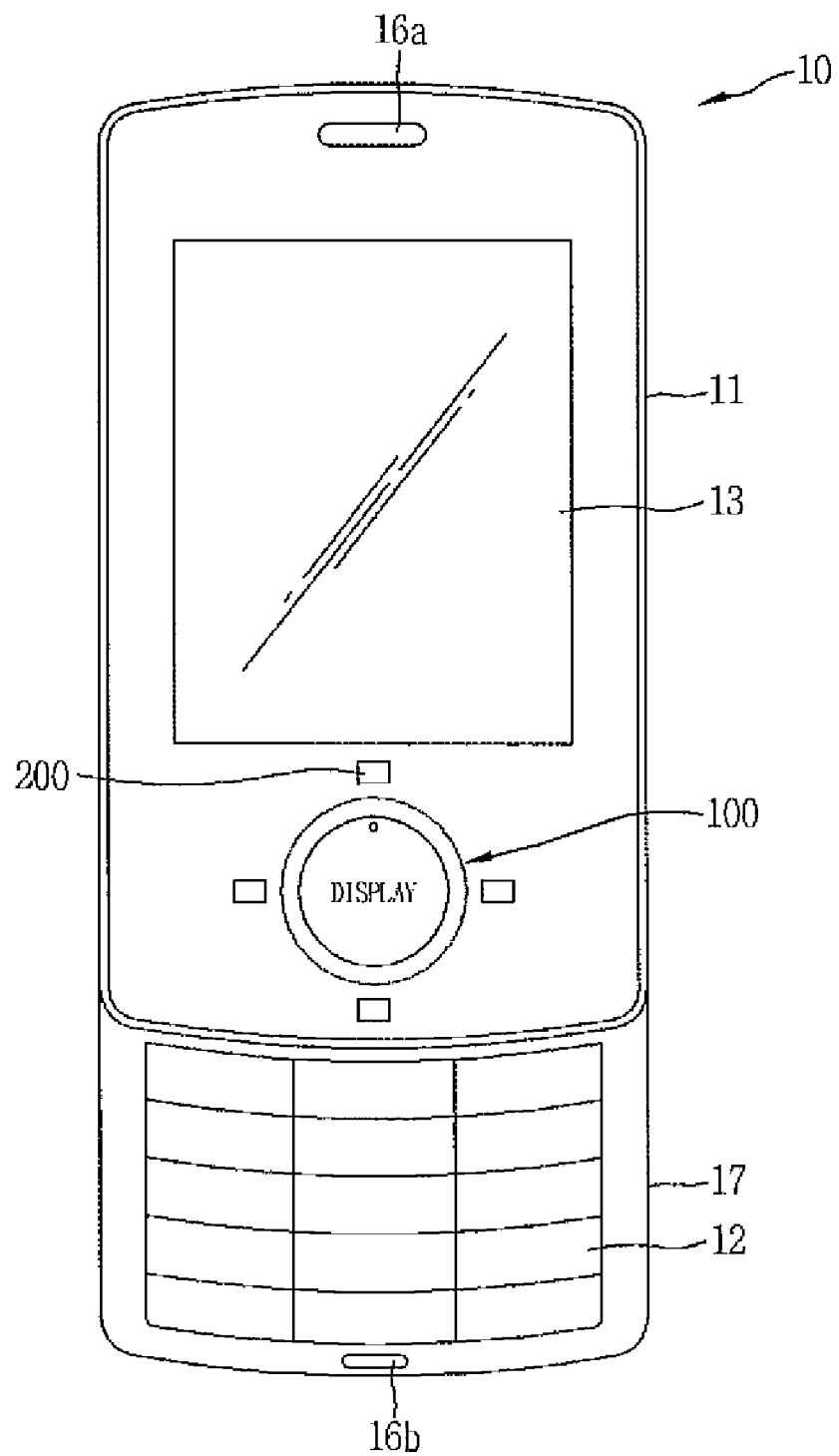
FIG. 6B is a diagram showing another aspect of the mobile communication terminal having the operation mode conversion device in accordance with another exemplary embodiment.

FIG. 6A and FIG. 6B show the mobile communication terminal 10 to which the operation mode conversion device is applied in accordance with another exemplary embodiment.

The scroll button 100 may be the same as that described above and an additional user interface means (e.g., one or more selection buttons 200) used for performing control functions with respect to the operation mode converted by the scroll button 100 may also be included in the operation mode conversion device in accordance with this embodiment. A means to display information about the control functions with respect to each operation mode converted by the scroll button 100 may be further implemented with one or more selection buttons 200.

Figure 7:
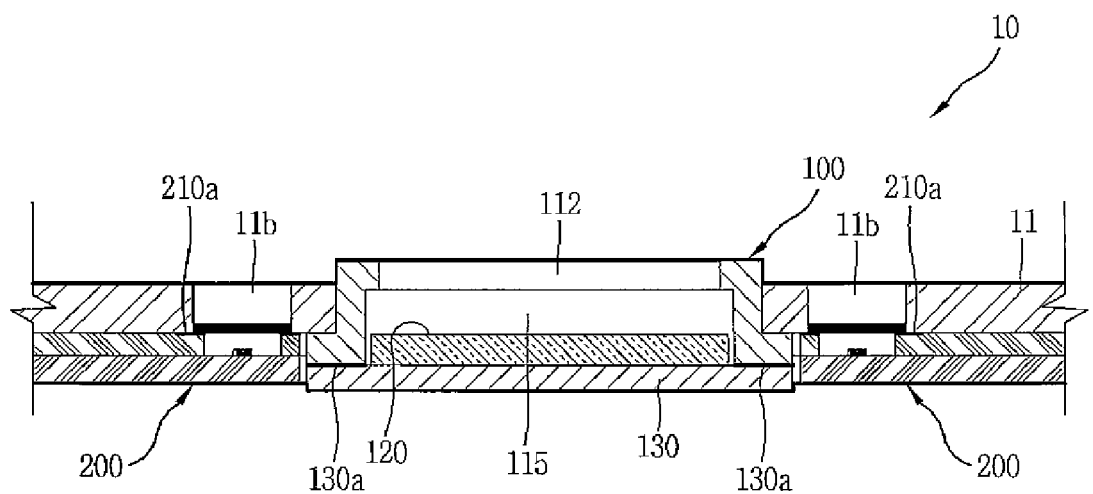
FIG. 7 is a brief cross-sectional view showing a state that the mobile communication terminal having the operation mode conversion device is cut along a line "VII-VII" of FIG. 6A.
Figure 8:
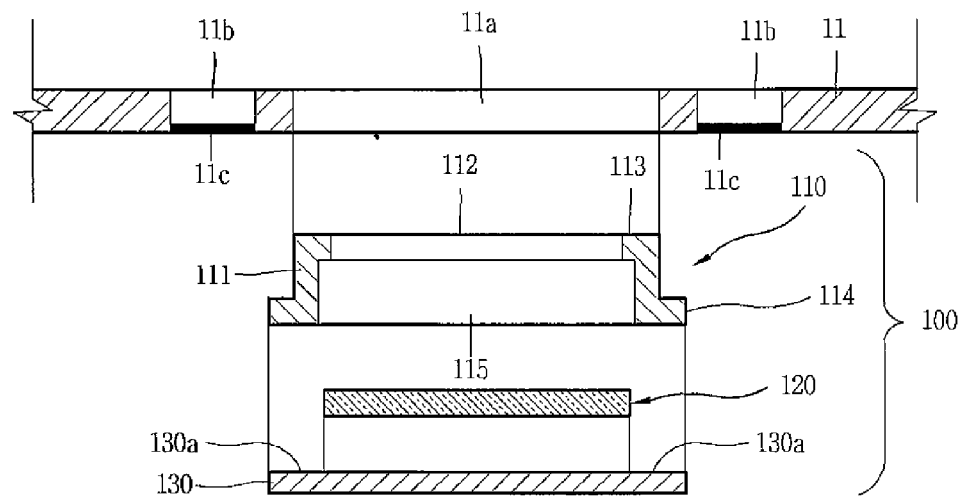
FIG. 8 is an exploded view of the mobile communication terminal of FIG. 7.

An example of this configuration may be implemented as illustrated in FIG. 7, whereby the scroll button 100 has the same structure as that of the first embodiment described previously, thus the detailed description will be omitted. However, the additional the selection buttons 200 that can be used together with the scroll button 100 will be described in more exemplary detail below.

The selection buttons 200 may be implemented as touch-sensitive elements (buttons, keys, regions, etc.) that detect changes in capacitance due to a user's touch operation.

The selection buttons 200 may include a board (or substrate) having a sensor unit 210a for detecting changes in capacitance (hereinafter, referring to "sensor board 210"), and a board mounting a light-emitting device 222 (or other type of visual output means) for providing (or displaying) information of the control function (hereinafter, referring to "light-emitting device board 220").

The sensor board 210 may be configured to have sensors with respect to each selection button 200, respectively, or to have one sensor board 210 with respect to the multiple selection buttons 200. Herein, the case of being configured to have one sensor board 210 with respect to multiple selection buttons 200 will be described.

A mounting hole (or opening) 211 is formed at the center (or near) of the sensor board 210 to provide at region at which the circuit board 130 of the scroll button 100 and the operation member 110 can be positioned. At least one or more light transmission holes 212 may be formed at the circumference of the mounting hole 211 in order to transmit the light from the light-emitting device 222. A sensor unit 210a detecting the changes in capacitance may be formed at the circumference of the light transmission hole 212.

The light-emitting device board 220 may be disposed at a lower portion of the sensor board 210. The mounting hole 221 may be formed at the central portion of the light-emitting device board 220 and at least one or more light-emitting device 222 is disposed at the position corresponded to the light transmission hole 212, at the central portion of the mounting hole 221. Further, the selection button 200 is coupled to the scroll button 100 that is positioned in the mounting hole 211, 221 formed on the sensor board 210 and the light-emitting device board 220 configuring the selection button 200.

Due to the signals generated by the operation of the scroll button 100, a control unit (a microprocessor or other controller) controls the information about the converted mode to be displayed by the display device 120 which is a display means of the scroll button 100, and controls the selection button 200 to be activated for operating the function corresponded to the converted operation mode through the selection button 200.

Herein, an activation of the selection button 200 includes the activation for manipulating the command for performing one or more functions with respect to the operation mode set for at each sensor area with respect to each selection button 200 of the sensor board 210.

Figure 9:
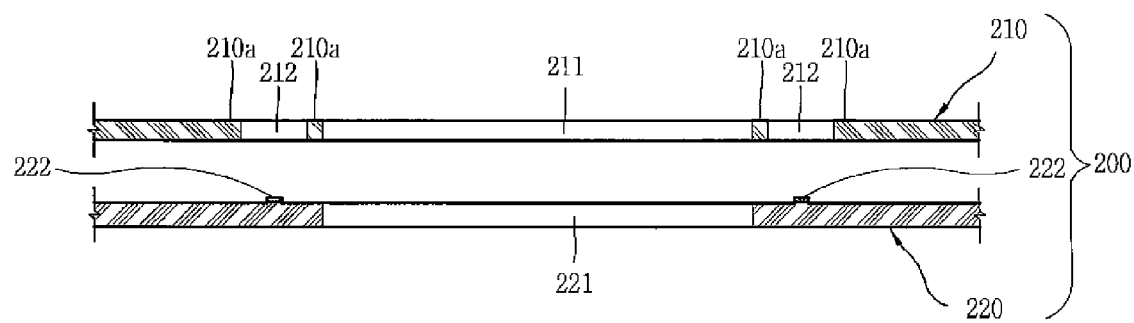
FIG. 9 is a cross-sectional view of an aspect of a display pattern formed on a selection button constituting the operation mode conversion device in accordance with an exemplary embodiment.
Figure 9:

Also, when the selection button 200 is activated to operate the function with respect to the converted operation mode, the light-emitting device 222 may be operated to display a pattern (or some other visual indication or output) indicating the control function with respect to the operation mode converted by the scroll button 100. Herein, the pattern (or indication) provided to the user by the light-emitting device 222 may be implemented as a particular display pattern 11c having different shapes as shown in FIG. 9. One or more display patterns (or indications) 11c may be implemented on the same display area and which can be illuminated accordingly.

In the example of the selection button 200 being applied to the mobile communication terminal 10, the display pattern 11c may be implemented within the terminal body 11. Herein, the light transmission window 11b for transmitting light irradiated from the light-emitting device 222 corresponding to the light transmission hole 212 of the sensor board 210 is located at the circumference of the mounting hole 11a that accommodates the scroll button 100 as described in the first embodiment. The display pattern 11c can be implemented on the light transmission window 11b. For example, the display pattern 11c may be implemented at a lower portion of the light transmission window 11b, but is not limited to such, and may be implemented on the upper surface of the light transmission window 11b or on an additional light transmission sheet.

Figure 10:
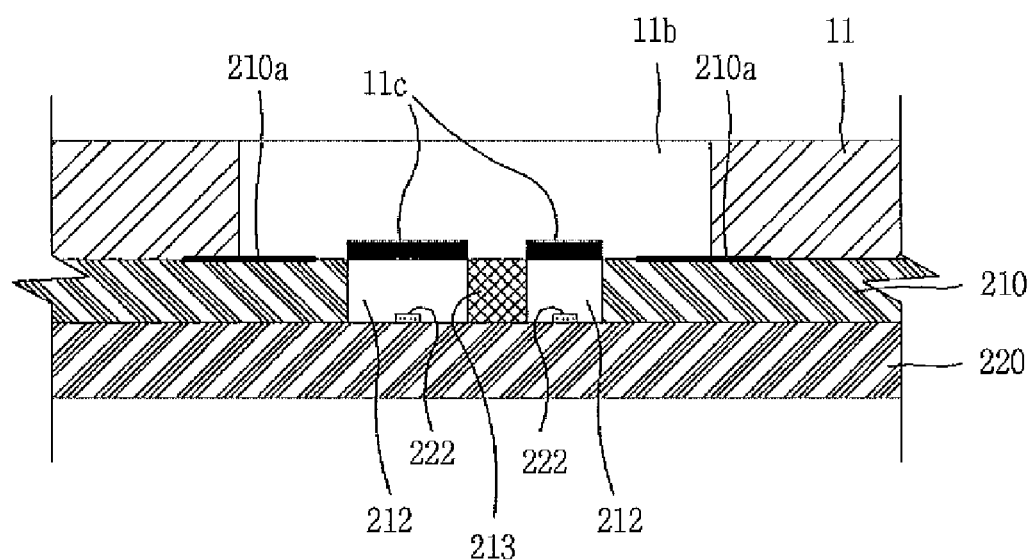
FIG. 10 is a cross-sectional view of another aspect of a selection button constituting the operation mode conversion device in accordance with an exemplary embodiment.

FIG. 10 shows a modified embodiment for the selection button 200.

In the embodiment of the modified selection button 200, at least one or more division walls 213 can be formed at the light transmission hole 212 of the sensor board 210. That is, the light transmission hole 212 may be divided into at least two or more regions by the division wall 213, and thus the divided light transmission hole 212 can be used to show multiple display patterns 11c, as shown in FIG. 9.

Thus, the light-emitting device 222 mounted on the light-emitting device board 220 can be mounted at positions corresponding to the area of the light transmission holes 212 divided by the division wall 213, respectively. Also, the display pattern 11*c* implemented on the light transmission window 11*b* of the terminal body 11 can be located at positions corresponding to the area of the light transmission holes 212 divided by the division wall 213, respectively.

Figure 11:
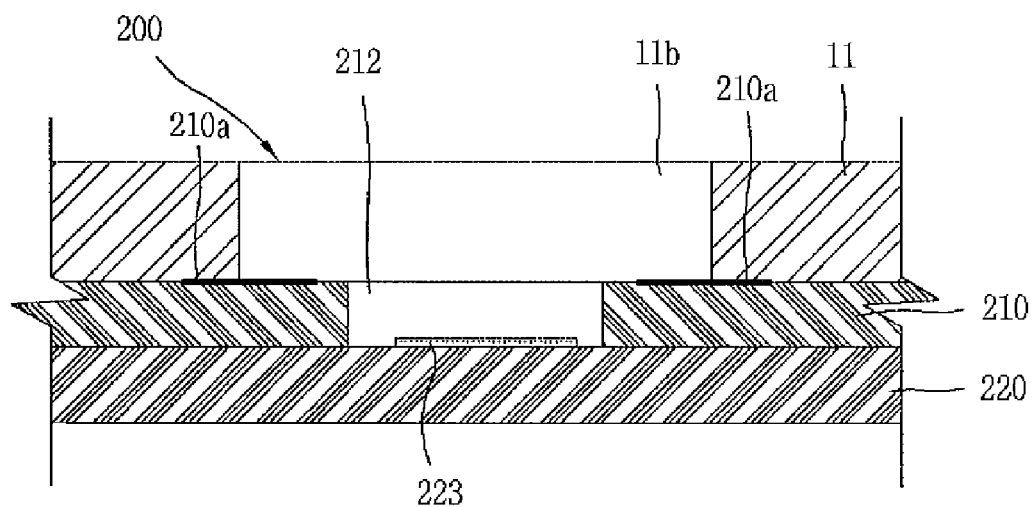
FIG. 11 a cross-sectional view of another aspect of a selection button constituting the operation mode conversion device in accordance with an exemplary embodiment.

FIG. 11 shows another modified embodiment of the selection button 200.

In this embodiment, instead of the display pattern and the light-emitting device, the display device 223 may be the same as that of the scroll button 100 for displaying the contents of information outputted at the selection button 200. In describing the configuration of this selection button 200, the sensor board 210 is configured to have one light transmission hole 212 that is not divided, and the display pattern is not implemented on the light transmission window 11*b* of the terminal body 11. Also, the display device board 220 is disposed at the lower portion of the sensor board 210, and the display device 223 is disposed at the position corresponded to the light transmission hole 212 of the sensor board 210 on the display device board 220.

That is, various display items (e.g., symbols, letters, figures, etc.) can be displayed (without the need to form additional patterns) via the display device 223. Herein, the display device 223 may be composed of an LCD, an LED or the like.

Figure 12A:
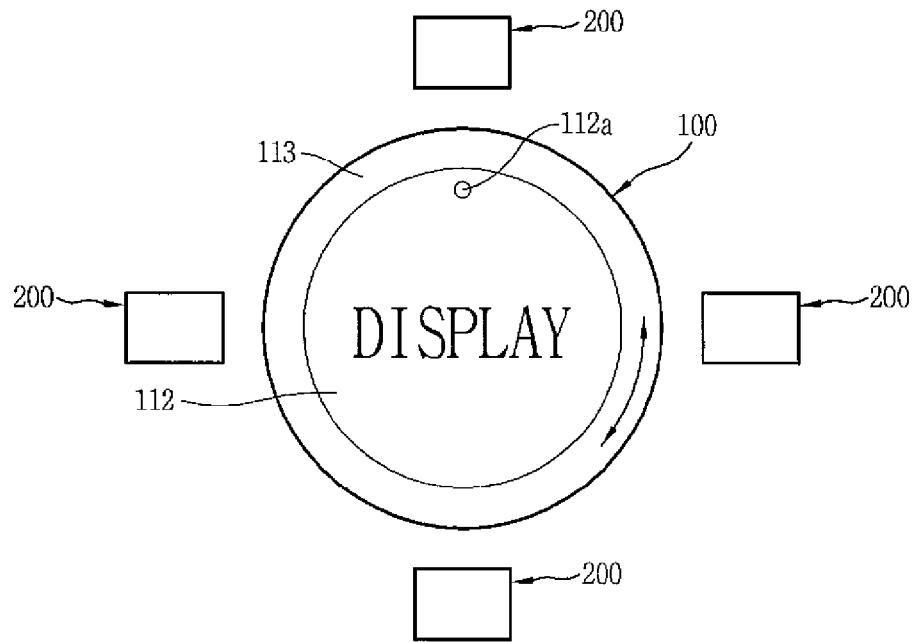
FIG. 12A through FIG. 12C is a diagram showing a state that a converted operation mode is displayed at the operation mode conversion device after the operation mode is converted by the operation mode conversion device in accordance with another exemplary embodiment.
Figure 12B:
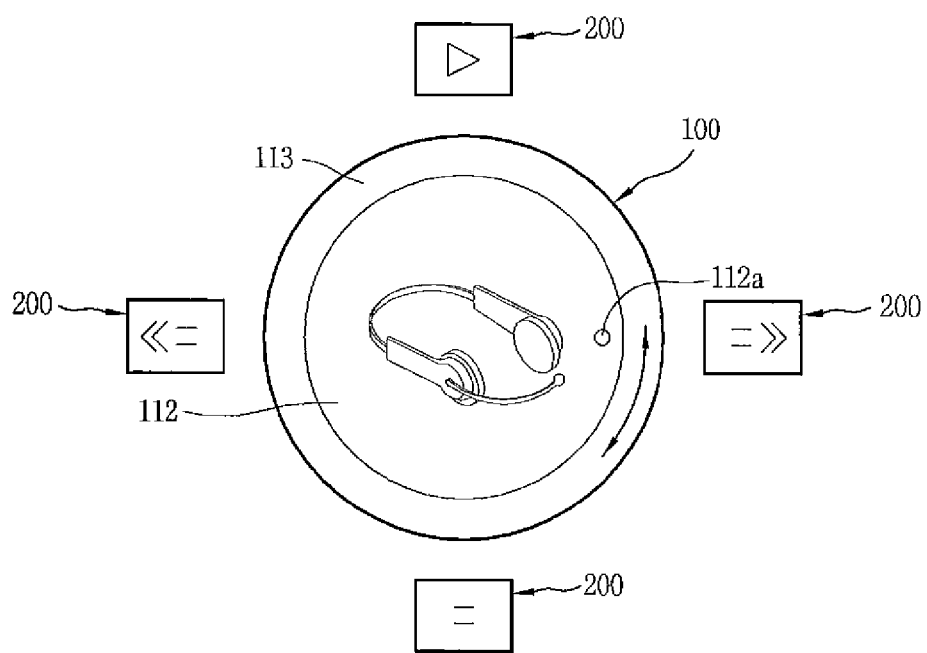
Figure 12C:
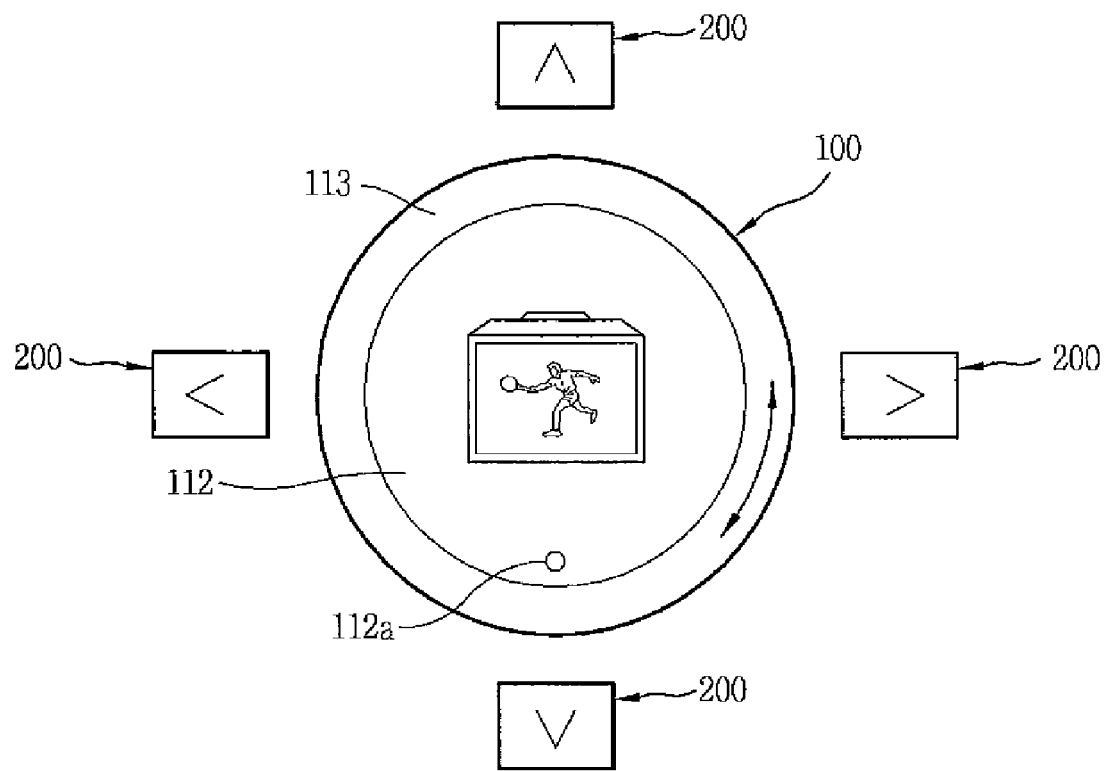

The operation mode conversion device including the scroll button 100 and the selection button 200 as aforementioned, may be configured to be operated as shown in FIGS. 12A through 12C.

As shown in FIG. 12A, when the scroll button 100 is in the initial mode, it may be configured to indicate its state in letters, or to output information such as the date, time, etc. In addition, no information is currently displayed on the selection buttons 200, or it may be that the functions associated with the selection buttons 200 are not activated.

FIGS. 12B and 12C show the state that the operation mode is converted as the user operates the scroll button 100 in the clockwise rotation direction.

When the first press unit 113 of the scroll button 100 is touched or swiped by the user's finger, the operation mode is converted into a desired operation mode according to the pressed position or changes in pressure. Appropriate information about the converted operation mode is outputted on the display area formed at the center (or near) of the scroll button 100. At the same time, the selection buttons 200 disposed at the circumference of the scroll button 100 are activated to allow control of functions associated with the converted operation mode. Also, when a selection button 200 is activated to operate the function with respect to the converted operation mode, the appropriate pattern indicating the control function with respect to the activated selection button 200 can be displayed on the display area of the selection button 200. In other words, the pattern indicating the function capable of controlling the operation mode converted by the scroll button 100 can be displayed.

The selected operation mode may be converted through another (separate) operation key as described in the embodiment of FIGS. 5A through 5C, or converted by pressing the entire first press unit 113 to generate signals with respect to the entire area of the sensor unit 130*a*.

Figure 13A:
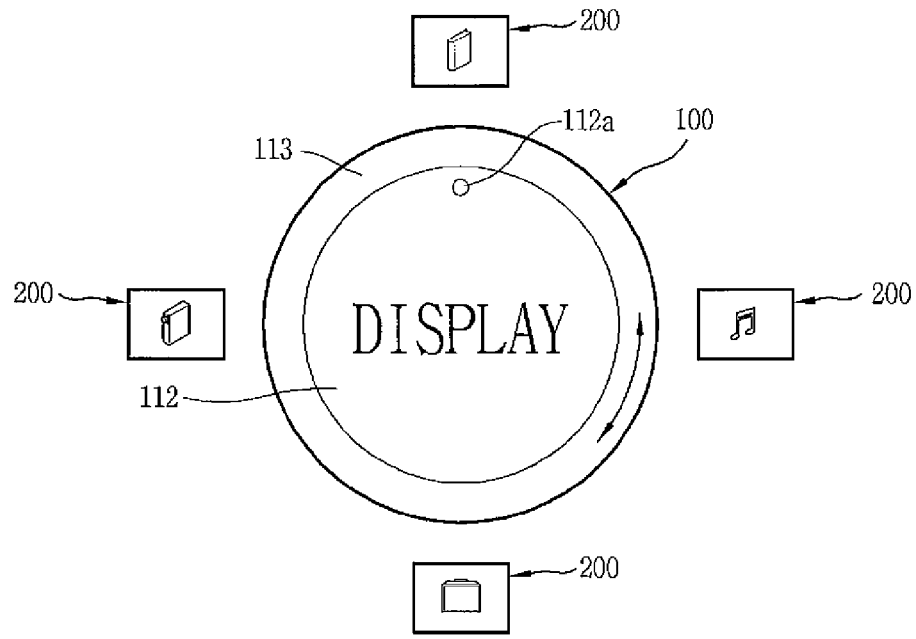
FIG. 13A through FIG. 13C is a diagram showing a state that a converted operation mode is displayed at the operation mode conversion device after the operation mode is converted by the operation mode conversion device in accordance with another exemplary embodiment.
Figure 13B:
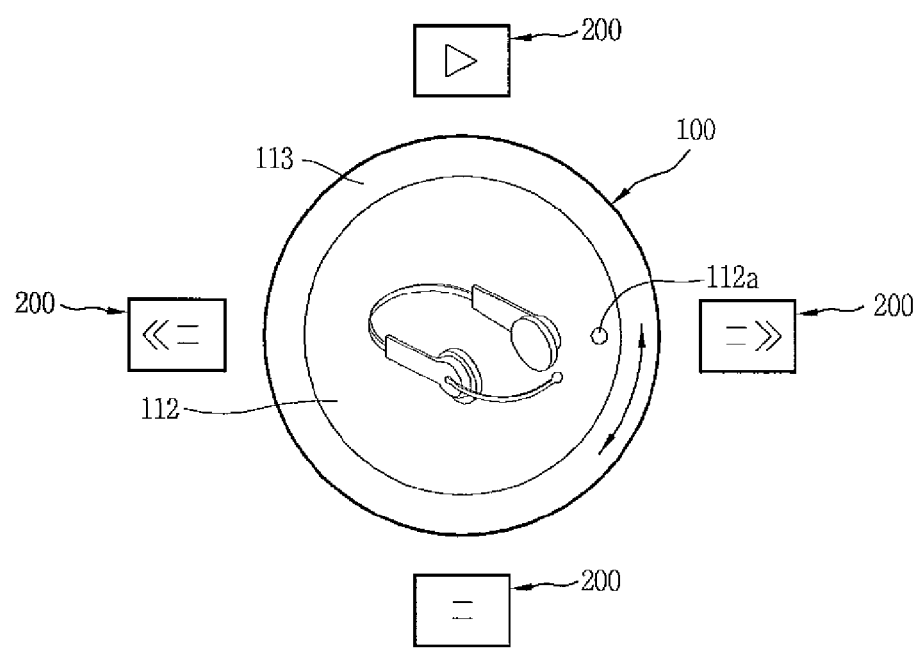
Figure 13C:
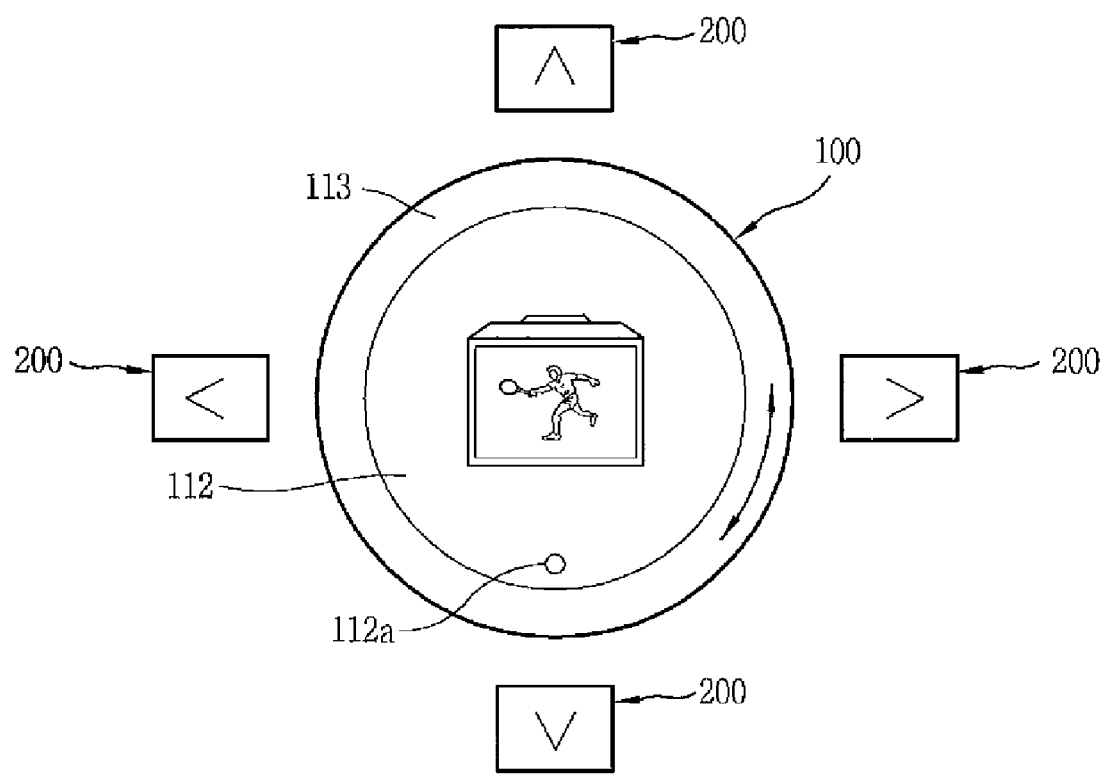

FIGS. 13A through 13C show an alternative configuration from that described above with respect to FIGS. 12A through 12C.

As shown in FIG. 13A, when the scroll button 100 is in the initial mode, it may be configured to indicate its state in letters, or to output information such as the date, time, etc. Herein, the selection button 200 disposed at the circumference of the scroll button 100 is activated to directly convert into some operation modes which are frequently used in the initial mode, herein, the display area of the selection button 200 may be configured to display the information about the operation mode.

Also, FIGS. 13B and 13C show the states that the user operates the scroll button 100 in the clockwise rotation direction, or through the selection button 200, in order to convert the operation modes, respectively.

Herein, the operation of converting the operation mode through the scroll button 100 is same as the example thereabove. That is, when scrolling (or touching or swiping) along the first press unit 113 of the scroll button 100, the operation mode is converted, and then the information about the converted operation mode is outputted on the display area formed at the central portion of the scroll button 100. At the same time, one or more selection buttons 200 disposed at the circumference of the scroll button 100 are activated for operating the function corresponded to the converted operation mode.

Further, when the selection button 200 is activated for operating the function corresponded to the converted operation mode, the pattern indicating the control function with respect to the operation mode converted by the scroll button 100 can be displayed on the display area of the selection button 200.

Further, when the selection button 200 is operated, the operation mode is converted, and accordingly, the information about the converted operation mode is outputted on the display area formed at the central portion of the scroll button 100, so as to convert the operation through the selection button 200. At the same time, the selection button 200 is activated for operating the function corresponded to the converted operation mode. Also, the pattern indicating the control function with respect to the operation mode converted by the selection button 200 on the display area of the selection button 200.

In this embodiment, the selected operation mode may be converted through another (separate) operation key as described in the embodiment of FIG. 5A through 5C, or converted by pressing the entire first press unit 113 to generate signals with respect to the entire area of the sensor unit 130*a*.

Some exemplary methods for converting the operation modes in accordance with each embodiment described thereabove will be described in more detail.

Figure 14:
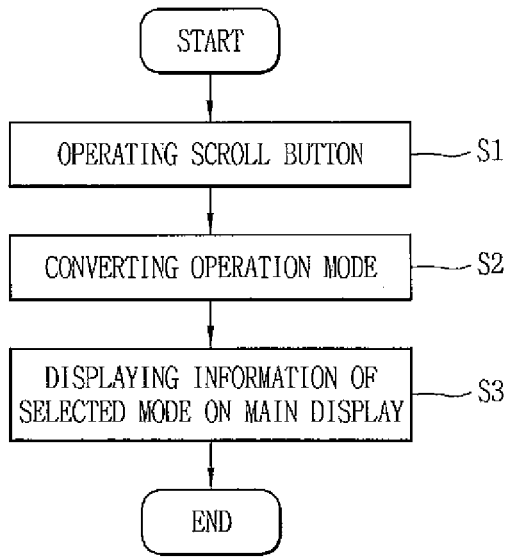
FIG. 14 is a flow chart showing a method for converting an operation mode in accordance with an exemplary embodiment.

Referring to FIG. 14, in the method for converting the operation mode in accordance with the first embodiment of the operation mode conversion device, the scroll button 100 is operated in order to convert the set operation mode in the first step S1.

Herein, in the operation method of the scroll button 100 in order to convert the operation mode, the first press unit 113 of the scroll button 100 is pressed, thereby the area of the sensor unit 130*a* is also pressed by the second press unit 114, as described thereabove.

In the next step S2, by the controlling unit (e.g., a microprocessor or other type of controller), the current operation mode is converted into the preset operation mode through the output resulting from the pressed position or the changes in pressure detected by the sensor unit 130*a* from the operation of the scroll button 100.

Once the operation mode has converted through step S2, in the next step S3, the information about the converted operation mode is outputted on the display area of the scroll button 100. The display area may include the display device 120 and the light transmission window 112 as described previously. Also, the information about the operation mode, which is outputted on the display area may be configured to output various types of items, such as letters, symbols, icons, etc.

Figure 15:
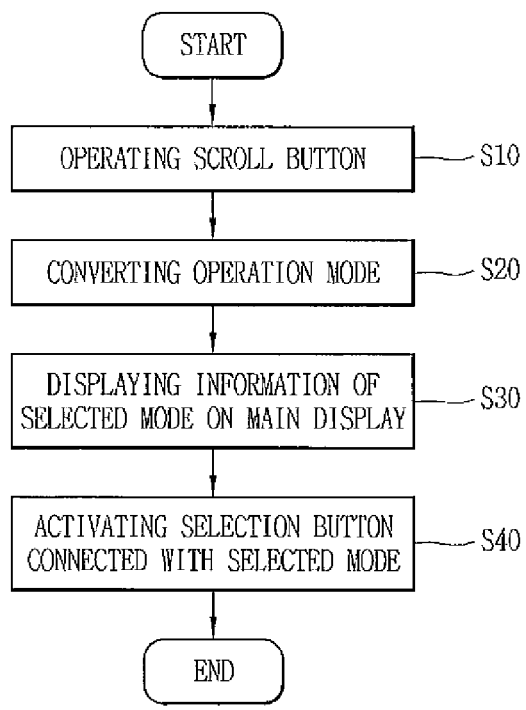
FIG. 15 is a flow chart showing the method for converting the operation mode in accordance with another exemplary embodiment.

Referring to FIG. 15, in the method for converting the operation mode in accordance with the second embodiment of the operation mode conversion device, the scroll button 100 is operated in order to convert the preset operation mode in the first step S10. The operation of the scroll button 100 is same as the method for converting the operation mode with respect to the first embodiment.

In the next step S20, by the controlling unit (e.g., a microprocessor or other type of controller), the current operation mode is converted into the preset operation mode through the output resulting from the pressed position or the changes in pressure detected by the sensor unit 130a from the operation of the scroll button 100.

Once the operation mode has converted through the step S20, in the next step S30, the main information and the sub-information about the converted operation modes are outputted on the display area of the scroll button 100 (i.e., a main display) and the display area disposed at the circumference of the scroll button 100 (i.e., a sub-display), respectively. Herein, the main information outputted on the display area of the scroll button 100 may be the information about the converted operation mode, the sub-information outputted on the display area may be the information indicating the control function with respect to the converted operation mode.

And, in the next step S40, the selection button 200 with respect to the corresponded mode is activated. That is, the selection button 200 is activated to enable the user to execute the converted operation mode.

A step of respectively outputting the main information and the sub-information about the converted information on the display area of the scroll button 100 (i.e. main display) and the display area of the selection button 200 disposed at the circumference of the scroll button 100 (i.e. sub-display) (S30) is performed. A step of activating the selection button 200 with respect to the corresponded mode to be conversely operated (S40) is performed. Alternatively, these two steps S30, S40 may be performed at the same time.

Further, the information outputted on the main display or the sub-display outputted on the display area may be configured to be outputted in various types of items, such as letters, symbols, icons, etc.

The method for converting the operation mode aforementioned and the method for converting the operation mode in accordance with another embodiment may be configured to be activated for a certain operation mode to be directly converted by the selection button 200.

Figure 16:
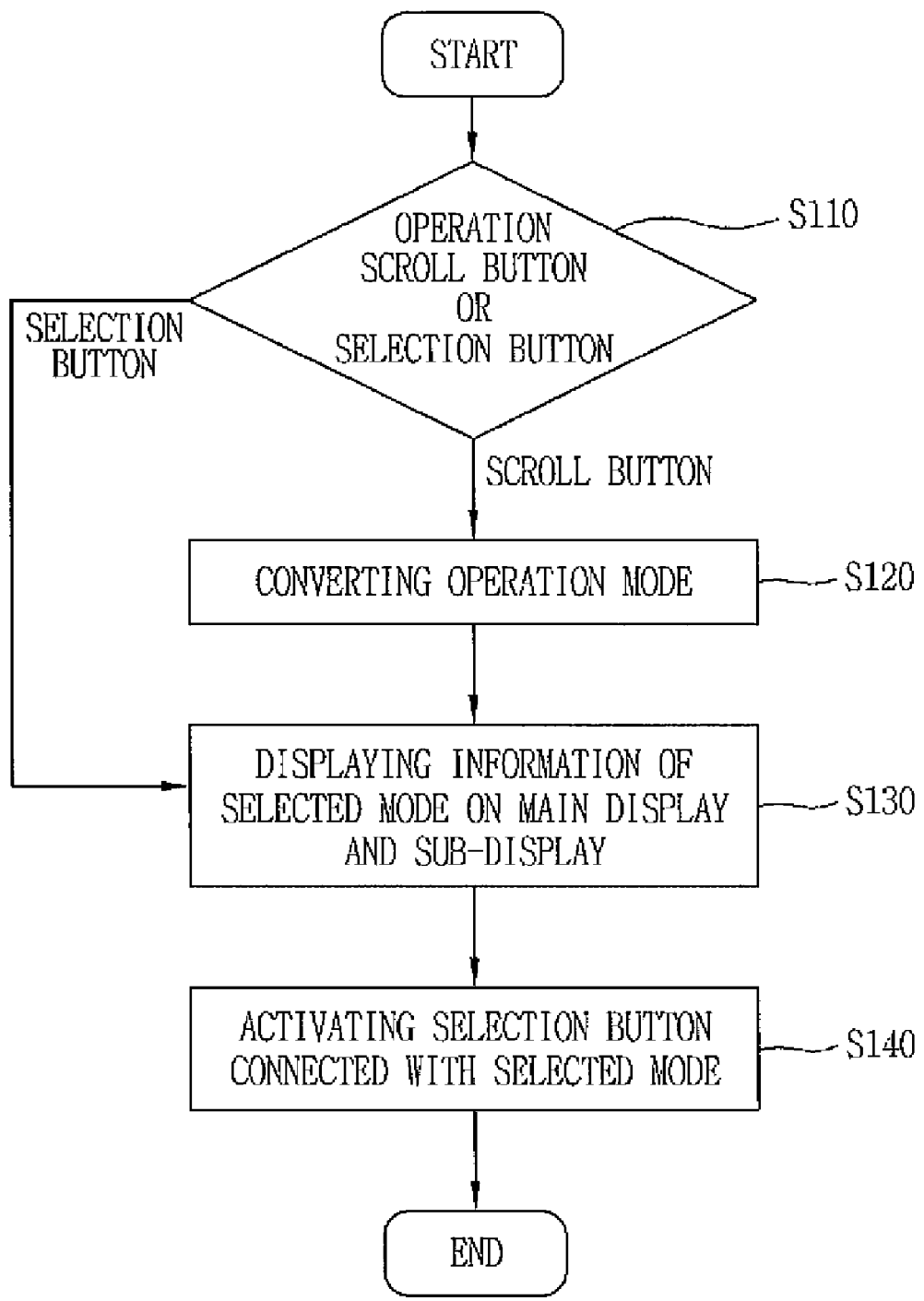
FIG. 16 is a flow chart showing the method for converting the operation mode in accordance with another exemplary embodiment.

Referring to FIG. 16, in the first step S110, a check is performed to determine whether the scroll button or the selection button has been operated for converting the set operation mode. Herein, when the scroll button 100 is operated for converting the set operation mode, the method for converting the operation mode by the scroll button 100 is same as the method described previously, thus its description will be omitted.

When the scroll button 100 is operated in the above step S110, the operation mode is converted according to the scrolled state of the scroll button 100 by the step of converting the operation mode S120. The converted process of the mode by the operation of the scroll button 100 is same as the two methods described previously, thus its description will be omitted.

Once the operation mode has been converted by the above step S120, in the next step S130, the main information and the sub-information about the converted operation modes are outputted on the display area of the scroll button 100 (i.e., main display) and the display area of the selection button 200 (i.e., sub-display), respectively. Herein, the main information outputted on the display area of the scroll button 100 is the information about the converted operation mode, and the sub-information outputted on the display area of the selection button 200 is the information indicating the control function with respect to the converted operation mode.

If the selection button 200 is operated in the first step S110, the step of outputting the main information and the sub-information about the converted operation modes on the display area of the scroll button 100 (i.e., main display) and the display area of the selection button 200 disposed at the circumference of the scroll button 100 may be directly performed (S130).

And, in the next step S140, the selection button 200 with respect to the corresponded mode is activated. That is, the selection button 200 is activated to enable the user to execute the converted operation mode.

A step of respectively outputting the main information and the sub-information about the converted information on the display area of the scroll button 100 (i.e., main display) and the display area of the selection button 200 disposed at the circumference of the scroll button 100 (i.e., sub-display) (S130) is performed. A step of activating the selection button 200 with respect to the corresponded mode to be conversely operated (S140) is performed. Alternatively, these two steps S130, S140 may be performed at the same time.

Further, the information outputted on the main display or the sub-display outputted on the display area may be configured to be outputted in various shapes, such as letters, symbols, icons, etc.

Herein, the selection button enables instruction information to be displayed as the current operation mode to be converted into the frequently used one, wherein the instructing information is capable of executing the converted operation mode.

Accordingly, the user can quickly and simply perform menu navigation to convert the operation mode into a desired mode, and easily view the information about the converted operation mode.

Furthermore, the operation mode conversion device for converting the operation mode simply and rapidly, can be configured in a simple manner and disposed at a small area of the mobile phone to thereby minimize its overall size.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The present disclosure thus being described, it will be obvious that the same may be varied in many ways. Such variations are not to be regarded as a departure from the characteristics and scope of the disclosure, and all such modifications as would be obvious to one skilled in the art are intended to be included within the scope of the following claims.

What is claimed:

1. An operation mode conversion device comprising:
    an input unit configured to generate a signal to switch a current operation mode to a selected operation mode upon being pressed by a user, the selected operation mode being set with respect to a position on the input unit;
    a display area located at a central portion of the input unit, the display area being configured to output information about the selected operation mode; and
    a circuit board having a sensor unit and a control unit,
    wherein the input unit includes an operation member having a first press portion which is capable of being pressed, the first press portion having a ring shape, a second press portion that presses the sensor unit, and a light transmission window,
    wherein the display area includes a display device disposed beneath the light transmission window and visible therethrough, and
    wherein the sensor unit is configured to generate signals corresponding to different operation modes according to how the operation member is pressed by the user and the control unit is configured to control the display device to output information related to the selected operation mode.

2. The operation mode conversion device of claim 1, wherein the operation member further comprises a connecting unit at the end of the second press unit.

3. The operation mode conversion device of claim 1, wherein the sensor unit is a force sensing resistor (FSR) sensor unit.

4. The operation mode conversion device of claim 1, wherein the input unit and display area are formed as a scroll button.

5. An operation mode conversion device comprising:
    an input unit configured to generate a signal to switch a current operation mode to a selected operation mode upon sensing applied pressed by a user, the selected operation mode being set with respect to a position of the user applied pressure;
    a display area located at a central portion of the input unit, the display area being configured to output information about the selected operation mode;
    a selection button having a graphical pattern indicating a control function related to the selected operation mode and to allow the user to operate the control function; and
    a circuit board having a sensor unit and a control unit,
    wherein the input unit includes an operation member having a first press unit capable of being pressed, the first press unit having a ring shape, a second press unit that presses the sensor unit, and a light transmission window disposed at the center of the first press unit,
    wherein the display area includes a display device disposed in a lower portion of the operation member under the light transmission window, and
    wherein the sensor unit is configured to generate signals corresponding to different operation modes according to a position of the external pressure applied to the operation member and the control unit is configured to control the display device to output information related to the selected operation mode.

6. The operation mode conversion device of claim 5, wherein the operation member further comprises a connecting unit at the end of the second press unit.

7. The operation mode conversion device of claim 5, wherein with the sensor unit is a force sensing resistor (FSR) sensor unit.

8. The operation mode conversion device of claim 5, wherein the selection button comprises:
    a second display to display the control function with respect to the selected operation mode converted by the input unit;
    a second sensor unit disposed adjacent to the area of the second display, the second sensor unit configured to sense a change in capacitance with respect to the position of the user applied pressure to output signals; and
    a light-emitting unit irradiating light to allow a user to recognize the graphical pattern formed on the second display.

9. The operation mode conversion device of claim 8, wherein the second display comprises:
    at least two display patterns;
    a light-emitting device corresponding to each display pattern; and
    a division wall that separates each display pattern and corresponding light emitting device.

10. The operation mode conversion device of claim 5, wherein the display includes one of an LCD and an LED.

11. An operation mode conversion device comprising:
    an input unit configured to generate a signal to switch a current operation mode to a selected operation mode upon sensing applied pressed by a user, the selected operation mode being set with respect to a position of the user applied pressure;
    a display area located at a central portion of the input unit, the display area being configured to output information about the selected operation mode;
    a selection button having a graphical pattern indicating a control function related to the selected operation mode and to allow the user to operate the control function,
    wherein the input unit comprises:
    a sensor unit;
    an operation member including a first press unit that is ring-shaped and capable of being pressed, a second press unit that presses the sensor unit, and a light transmission window;
    a display device disposed at a position corresponding to the light transmission window in a lower portion of the operation member and visible through the display area; and
    a control unit controlling the display device to be capable of outputting information related to the operation mode, wherein the sensor unit is configured to output each operation mode according to the positions corresponding to the second press unit; and wherein the selection button comprises:
- a second sensor unit sensing a change in capacitance with respect to the pressed position, and
- a second display displaying the control function with respect to the operation mode converted by the input unit.

12. A mobile communication terminal having an operation mode conversion device, the mobile communication terminal comprising:
   at least one body provided with a display and an input device; and
   the operation mode conversion device mounted in the body, wherein the operation mode conversion device includes:
      an input unit configured to generate a signal to switch a current operation mode to a selected operation mode upon being pressed by a user, the selected operation mode being set with respect to a position on the input unit;
      a display area located at a central portion of the input unit, the display area being configured to output information about the selected operation mode; and
      a circuit board having a sensor unit and a control unit,
   wherein the input unit includes an operation member having a first press portion which is capable of being pressed, the first press portion having a ring shape, a second press portion that presses the sensor unit, and a light transmission window,
   wherein the display area includes a display device disposed beneath the light transmission window and visible therethrough, and
   wherein the sensor unit is configured to generate signals corresponding to different operation modes according to how the operation member is pressed by the user and the control unit is configured to control the display device to output information related to the selected operation mode.

13. The mobile communication terminal of claim 12, wherein the operation member further comprises a connecting unit at the end of the second press unit.

14. The mobile communication terminal of claim 12, wherein the sensor unit is a force sensing resistor (FSR) sensor unit.

15. A mobile communication terminal having an operation mode conversion device, the mobile communication terminal comprises:
   at least one body provided with a display and an input device; and
   the operation mode conversion device mounted in the body, wherein the operation mode conversion device includes:
      an input unit configured to generate a signal to switch a current operation mode to a selected operation mode upon sensing applied pressed by a user, the selected operation mode being set with respect to a position of the user applied pressure;
      a display area located at a central portion of the input unit, the display area being configured to output information about the selected operation mode; and
      a selection button having a graphical pattern indicating a control function related to the selected operation mode and to allow the user to operate the control function,
   wherein the input unit includes:
   a circuit board having a sensor unit and a control unit,
   wherein the input unit includes an operation member having a first press unit capable of being pressed, the first press unit having a ring shape, a second press unit that presses the sensor unit, and a light transmission window disposed at the center of the first press unit;
   wherein the display area includes a display device disposed in a lower portion of the operation member under the light transmission window, and
   wherein the sensor unit is configured to generate signals corresponding to different operation modes according to a position of the external pressure applied to the operation member and the control unit is configured to control the display device to output information related to the selected operation mode.

16. The mobile communication terminal of claim 15, wherein the operation member further comprises a connecting unit at the end of the second press unit.

17. The mobile communication terminal of claim 15, wherein with the sensor unit is a force sensing resistor (FSR) sensor unit.

18. The mobile communication terminal of claim 15, wherein the selection button comprises:
   a second display to display the control function with respect to the selected operation mode converted by the input unit;
   a second sensor unit disposed adjacent to the area of the second display, the second sensor unit configured to sense a change in capacitance with respect to the position of the user applied pressure to output signals; and
   a light-emitting unit irradiating light to allow a user to recognize the graphical pattern formed on the second display.

19. The mobile communication terminal of claim 18, wherein the second display comprises:
   at least two display patterns;
   a light-emitting device corresponding to each display pattern; and
   a division wall that separates each display pattern and corresponding light emitting device.

20. The mobile communication terminal of claim 15, wherein the display includes one of an LCD and an LED.

21. A mobile communication terminal having an operation mode conversion device, the mobile communication terminal comprises:
   at least one body provided with a display and an input device; and
   the operation mode conversion device mounted in the body, wherein the operation mode conversion device includes:
      an input unit configured to generate a signal to switch a current operation mode to a selected operation mode upon sensing applied pressed by a user, the selected operation mode being set with respect to a position of the user applied pressure;
      a display area located at a central portion of the input unit, the display area being configured to output information about the selected operation mode; and
   a selection button having a graphical pattern indicating a control function related to the selected operation mode and to allow the user to operate the control function,
   wherein the input unit comprises:
   a sensor unit;
   an operation member including a first press unit that is ring-shaped and capable of being pressed, a second press unit that presses the sensor unit, and a light transmission window; and a display device disposed at a position corresponding to the light transmission window in a lower portion of the operation member and visible through the display area; and
a control unit controlling the display device to be capable of outputting information related to the operation mode,
wherein the sensor unit is configured to output each operation mode according to the positions corresponding to the second press unit; and
wherein the selection button comprises:
a second sensor unit sensing a change in capacitance with respect to the pressed position, and
a second display displaying the control function with respect to the operation mode converted by the input unit.

* * * * *